United States Patent
Li et al.

(10) Patent No.: US 8,231,796 B1
(45) Date of Patent: Jul. 31, 2012

(54) METHOD AND SYSTEM FOR PROVIDING A MAGNETIC RECORDING TRANSDUCER HAVING SIDE SHIELDS

(75) Inventors: Yun-Fei Li, Fremont, CA (US);
Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 776 days.

(21) Appl. No.: 12/331,238

(22) Filed: Dec. 9, 2008

(51) Int. Cl.
*B44C 1/22* (2006.01)

(52) U.S. Cl. ............. 216/22; 216/74; 216/89; 216/96

(58) Field of Classification Search ............. 216/22, 216/74, 89, 96
See application file for complete search history.

(56) References Cited

U.S. PATENT DOCUMENTS

| | | | |
|---|---|---|---|
| 6,497,825 B1 * | 12/2002 | Kamijima | ............. 216/22 |
| 6,943,993 B2 | 9/2005 | Chang et al. | |
| 6,949,833 B2 | 9/2005 | O'Kane et al. | |
| 6,954,340 B2 | 10/2005 | Shukh et al. | |
| 6,975,486 B2 | 12/2005 | Chen et al. | |
| 6,980,403 B2 | 12/2005 | Hasegawa | |
| 7,024,756 B2 | 4/2006 | Le et al. | |
| 7,042,682 B2 | 5/2006 | Hu et al. | |
| 7,067,066 B2 | 6/2006 | Sasaki et al. | |
| 7,070,698 B2 | 7/2006 | Le | |
| 7,075,756 B1 | 7/2006 | Mallary et al. | |
| 7,124,498 B2 | 10/2006 | Sato | |
| 7,193,815 B1 | 3/2007 | Stoev et al. | |
| 7,239,479 B2 | 7/2007 | Sasaki et al. | |
| 7,295,401 B2 | 11/2007 | Jayasekara et al. | |
| 7,296,339 B1 | 11/2007 | Yang et al. | |
| 7,322,095 B2 | 1/2008 | Guan et al. | |
| 7,337,530 B1 | 3/2008 | Stoev et al. | |
| 7,444,740 B1 * | 11/2008 | Chung et al. | ............. 29/603.16 |
| 7,508,627 B1 * | 3/2009 | Zhang et al. | ............. 360/125.12 |
| 7,587,811 B2 | 9/2009 | Balamane et al. | |
| 7,804,666 B2 | 9/2010 | Guan et al. | |
| 8,015,692 B1 | 9/2011 | Zhang et al. | |
| 8,166,631 B1 | 5/2012 | Tran et al. | |
| 2002/0071208 A1 | 6/2002 | Batra et al. | |
| 2004/0032692 A1 | 2/2004 | Kobayashi | |
| 2004/0156148 A1 | 8/2004 | Chang et al. | |
| 2005/0057852 A1 | 3/2005 | Yazawa et al. | |
| 2005/0068669 A1 | 3/2005 | Hsu et al. | |
| 2006/0044681 A1 | 3/2006 | Le et al. | |
| 2006/0044682 A1 | 3/2006 | Le et al. | |

(Continued)

OTHER PUBLICATIONS

Mallary et al., "One Terabit per Square Inch Perpendicular Recording Conceptual Design", IEEE Transactions on Magnetics, vol. 38, No. 4, pp. 1719-1724, Jul. 2002.

*Primary Examiner* — Binh X Tran

(57) ABSTRACT

A method and system provide a magnetic transducer that includes an underlayer and a nonmagnetic layer on the underlayer. The method and system include providing a trench in the nonmagnetic layer. The trench has a plurality of sides. The method and system also include providing a separation layer in the trench. A portion of the separation layer resides on the sides of the trench. The method and system include providing the main pole. At least part of the main pole resides in the trench on the portion of the separation layer and has a plurality of pole sides. The method and system further include removing at least a portion of the second nonmagnetic layer, thereby exposing the portion of the separation layer. The method and system also include providing a side shield. The separation layer magnetically separates the pole sides from the side shield.

17 Claims, 12 Drawing Sheets

U.S. PATENT DOCUMENTS

| | | |
|---|---|---|
| 2006/0082924 A1 | 4/2006 | Etoh et al. |
| 2006/0098334 A1 | 5/2006 | Jayasekara et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0245545 A1 | 10/2007 | Pentek et al. |
| 2007/0247749 A1 | 10/2007 | Bonhote et al. |
| 2007/0253107 A1 | 11/2007 | Mochizuki et al. |
| 2007/0258167 A1 | 11/2007 | Allen et al. |
| 2007/0263324 A1 | 11/2007 | Allen et al. |
| 2007/0268626 A1 | 11/2007 | Taguchi et al. |
| 2007/0268627 A1 | 11/2007 | Le et al. |
| 2008/0113090 A1* | 5/2008 | Lam et al. .......... 427/123 |
| 2008/0113514 A1* | 5/2008 | Baer et al. .......... 438/699 |
| 2008/0253035 A1 | 10/2008 | Han et al. |
| 2008/0297945 A1 | 12/2008 | Han et al. |
| 2009/0002885 A1 | 1/2009 | Sin |
| 2009/0109570 A1* | 4/2009 | Scholz et al. .......... 360/129 |
| 2009/0168236 A1 | 7/2009 | Jiang et al. |
| 2010/0061016 A1* | 3/2010 | Han et al. .......... 360/125.3 |

* cited by examiner

METHOD AND SYSTEM FOR PROVIDING A MAGNETIC RECORDING TRANSDUCER HAVING SIDE SHIELDS

BACKGROUND

Side shields, particularly in combination with leading or trailing shields, may be desired in conventional magnetic recording transducers, particular perpendicular magnetic recording (PMR) transducers. Side shields in combination with trailing shields that surround the sides and trailing edge of the main PMR pole are termed wraparound shields. Some conventional wraparound shields may be formed on poles that are dry etched. In such conventional PMR transducers, the ferromagnetic material for the PMR pole may be blanket deposited. A portion of the ferromagnetic material is then removed, typically through a dry etch process. The PMR pole is thus formed. Side and top gaps are deposited, followed by the conventional side and trailing edge shields. Although a wraparound shield for such a conventional PMR transducer may be formed, the on-track field and field gradient may be compromised. Further, the performance of such a conventional PMR pole may be more sensitive to dimensional variations in fabrication. Consequently, the magnetic trackwidth and performance may be subject to undesirable variations.

Other conventional methods allow for formation of side shields without requiring the main pole to be trimmed. FIG. 1 depicts a conventional method 10 for fabricating a conventional PMR transducer having a wraparound shield without trimming of the main pole. The conventional method 10 commences by blanket depositing a magnetic material used for the conventional side shield, via step 12. Step 12 includes plating a NiFe layer. A trench for the conventional main pole is formed in the NiFe layer, via step 14. The trench for the conventional main pole has a reverse angle. Thus, the top of the trench is wider than the bottom of the trench. The trench is formed in step 14 by performing a NiFe reactive ion etch (RIE). A nonmagnetic layer is then deposited in the trench, via step 16. The nonmagnetic layer is used to form a side gap between the side shield and the conventional main pole. The conventional main pole may then be provided on the nonmagnetic layer, via step 18. Typically, step 18 includes depositing the material for the conventional main pole followed by a planarization, such as a chemical mechanical planarization (CMP). Fabrication of the conventional transducer may then be completed. For example, a write gap, trailing edge shield, coils, and other components may be fabricated.

FIG. 2 depicts air-bearing surface (ABS) and side views of a conventional, magnetic transducer 50. For clarity, FIG. 2 is not drawn to scale and only certain structures are depicted. The conventional transducer 50 includes a conventional side shield 52, a conventional nonmagnetic layer 54, and a conventional main pole 56. The conventional nonmagnetic layer 54 separates the conventional main pole 56 from the conventional side shield 52. Also shown are a write gap 58 and conventional trailing edge shield 60. Conventional coils 62 are depicted by dotted lines in the plan view of the conventional transducer 50.

Although the conventional method 10 allows the conventional transducer 50 to be fabricated, there are several drawbacks. The NiFe RIE performed in step 14 may be difficult to control. In particular, forming a trench having the desired reverse angle and other features may be problematic. Performance of the resulting conventional PMR transducer may, therefore, suffer. The conventional side shield 52 also surrounds the conventional main pole 56. As a result, it may be difficult to separately control the geometry of the conventional side shield 52 and the geometry of the conventional main pole 56. In addition, because of the location of the coils 62, the conventional side shield 52 may be at least partially driven by the current through the coils 62. As a result, performance of the conventional side shield 52 may suffer.

Accordingly, what is needed is a system and method for improving the fabrication of a magnetic recording head having side shields.

BRIEF SUMMARY OF THE INVENTION

A method and system provide a magnetic transducer that includes an underlayer and a nonmagnetic layer on the underlayer. The method and system include providing a trench in the nonmagnetic layer. The trench has a plurality of sides. The method and system also include providing a separation layer in the trench. A portion of the separation layer resides on the plurality of sides of the trench. The method and system include providing the main pole. At least part of the main pole resides in the trench on the portion of the separation layer and has a plurality of pole sides. The method and system further include removing at least a portion of the second nonmagnetic layer, thereby exposing the portion of the separation layer on the sides of the trench. The method and system also include providing a side shield. The separation layer magnetically separates the plurality of pole sides from the side shield.

DETAILED DESCRIPTION OF THE PREFERRED EMBODIMENTS

Figure 1:
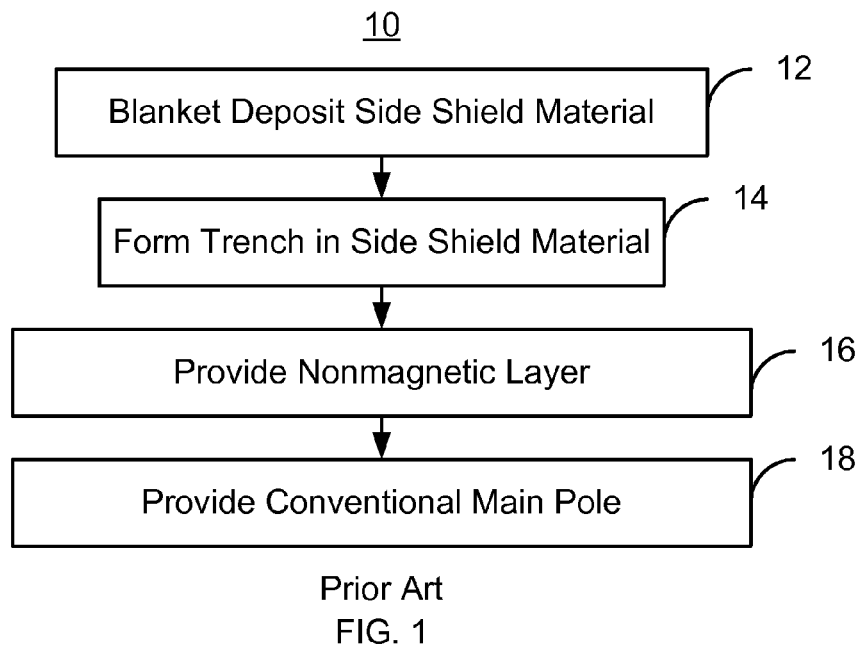
FIG. 1 is a flow chart depicting a conventional method for fabricating a magnetic recording transducer.
Figure 2:
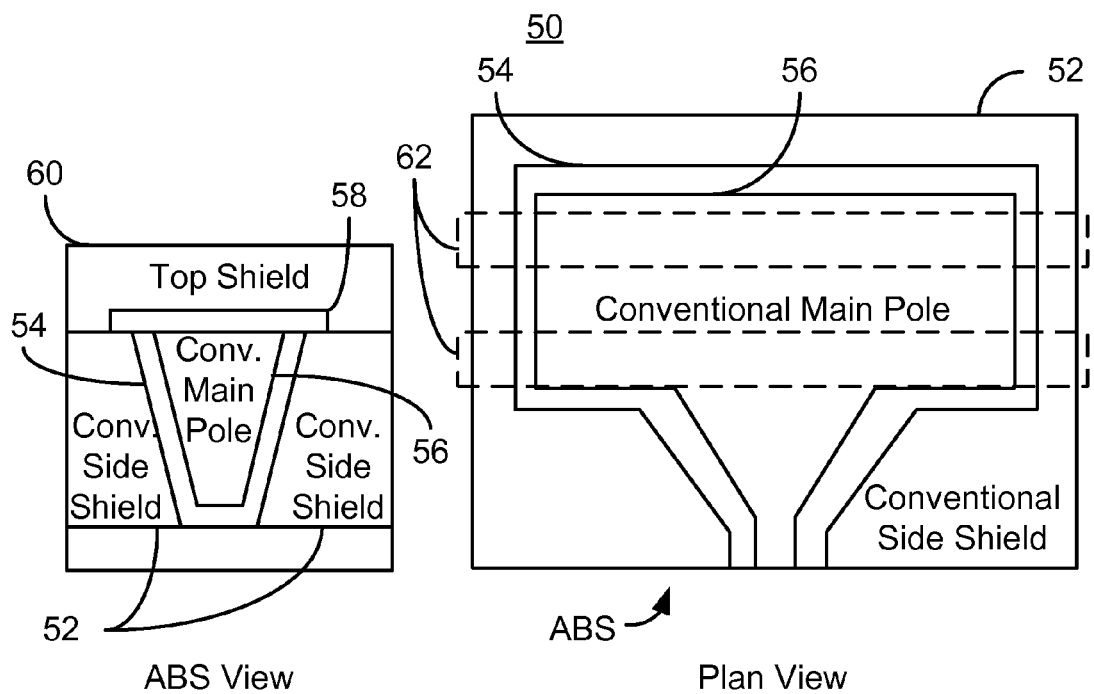
FIG. 2 depicts plan and ABS views of a conventional magnetic recording head.
Figure 3:
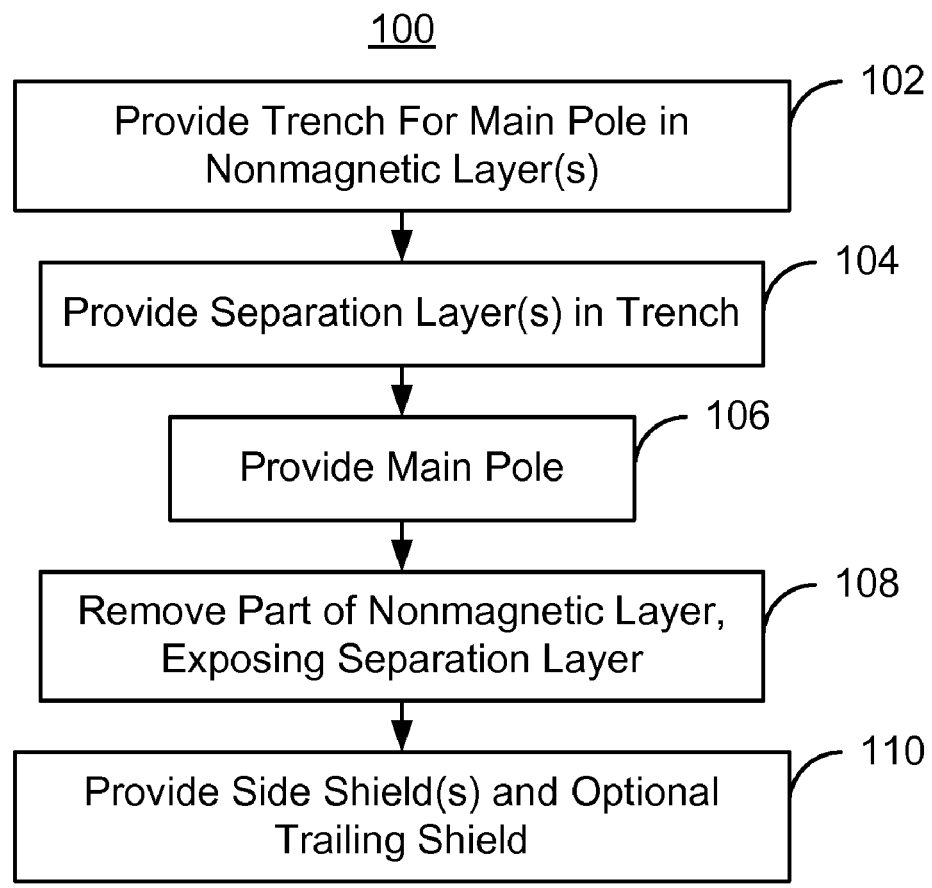
FIG. 3 is a flow chart depicting an exemplary embodiment of a method for fabricating a magnetic recording transducer having side shields.

FIG. 3 is an exemplary embodiment of a method 100 for providing magnetic recording transducer having side shields. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 commences after formation of an underlayer and one or more nonmagnetic layers on the underlayer. The underlayer is nonmagnetic and may be an RIE stop layer. Further, the underlayer may reside on a leading shield. In one embodiment, the nonmagnetic layer(s) are an insulator, such as aluminum oxide, silicon nitride, or silicon oxide. In another embodiment, the nonmagnetic layer(s) may include cured photoresist. Thus, a variety of materials may be used for the nonmagnetic layer(s).

A trench is provided in the nonmagnetic layer(s), via step 102. The sidewalls of the trench may correspond to the inner edges of side shield(s) being provided. The profile of the trench also may correspond to the main pole to be formed. The trench formed also may have a reverse angle, with the top of the trench being wider than its bottom. In one embodiment, step 102 includes providing a mask having an aperture corresponding to the location of the trench. Portions of the nonmagnetic layer(s) exposed by the aperture may then be removed. The removal may use a RIE appropriate to the nonmagnetic material in which the trench is being formed and employ an RIE hard mask. In such an embodiment, the underlayer may form the bottom of the trench and may be a RIE stop layer. However, in another embodiment, the stop layer may be omitted. The mask used to form the trench may then be removed.

At least one separation layer is provided in the trench on the nonmagnetic layer, via step 104. In one embodiment, step 104 may include using atomic layer deposition (ALD) to provide the separation layer. However, in other embodiments, other techniques might be used. Thus, a portion of the separation layer(s) resides on the sides of the trench. In one embodiment, the separation layer(s) include one or more layers of aluminum oxide and/or Ru. However, another nonmagnetic material that is resistant to the process used in step 108, described below, may be used.

The main pole is provided, via step 106. At least a portion of the main pole resides in the trench on the portion of the separation layer(s). In one embodiment, step 106 may include depositing seed layer(s), depositing layer(s) of high magnetic moment material(s) for the main pole, and planarizing the high magnetic moment material(s). Deposition of layer(s) could include the use of techniques such as physical vapor deposition (PVD), ion beam deposition, plating, and/or chemical vapor deposition (CVD). Step 106 may also include forming leading and/or trailing edge bevels.

At least a portion of the nonmagnetic layer(s) around the separation layer(s) is removed, via step 108. Thus, the portion of the separation layer(s) on the sides of the trench is exposed. The technique(s) used to remove the portion of the nonmagnetic layer(s) may vary and may depend upon the nonmagnetic layer used. Similarly, the separation layer(s) provided in step 104 may depend upon the technique(s) used to remove the nonmagnetic layer(s) in step 108 and, therefore, the nonmagnetic layer(s) used. Step 108 may thus include using one or more of a wet etch, an RIE, and a plasma etch. For example, a wet etch might be used for an aluminum oxide nonmagnetic layer, a plasma etch or RIE may be used for aluminum oxide, silicon oxide, silicon nitride, or cured photoresist. In some embodiments, a fluorine chemistry might be used for silicon oxide, while a chlorine chemistry might be used for aluminum oxide, and an oxygen chemistry might be used for cured photoresist. Alternatively, a combination of techniques, for example a combination of a wet etch and an RIE and/or plasma etch might be used in step 108.

At least one side shield is provided, via step 110. Step 110 may include plating shield materials and/or depositing the materials using some other technique. The side shield(s) surround at least the sides of the main pole formed in step 106. Because of the presence of the separation layer(s) provided in step 104, the side shield(s) are magnetically separated from the sides of the main pole. In addition to side shields, a trailing shield may also be provided. Thus, side shields only or a wraparound shield may be provided. Using the method 100, therefore, a PMR transducer having side shields or a wraparound shield may be fabricated.

Figure 4:
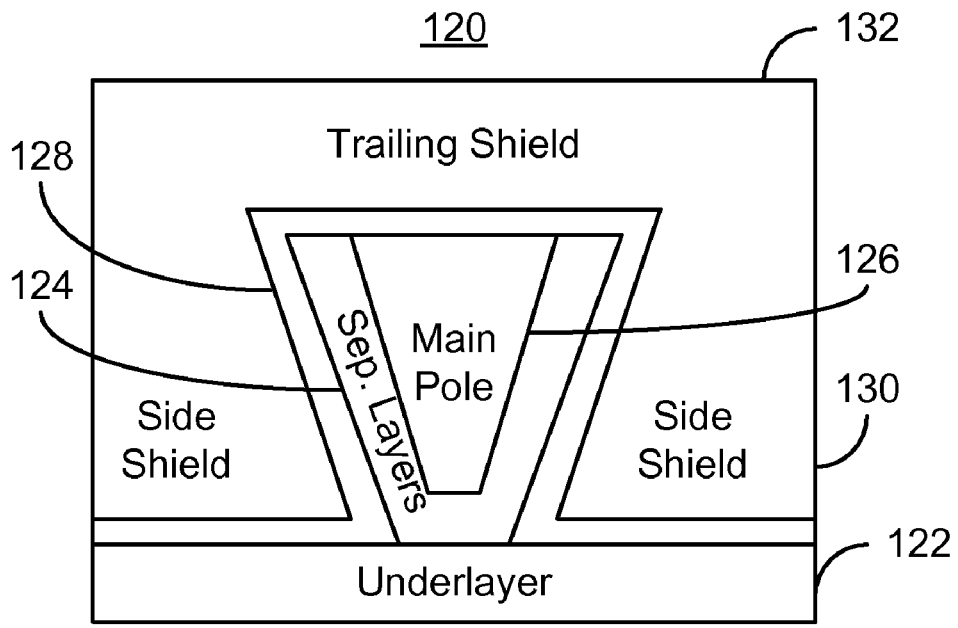
FIG. 4 depicts an ABS view of an exemplary embodiment of a magnetic recording transducer having side shields.

FIG. 4 an ABS view of an exemplary embodiment of a magnetic recording transducer 120 having side shields and formed using the method 100. For clarity, FIG. 4 is not to scale and only certain structures are depicted. The transducer 120 may be part of a head including a slider and which is part of a disk drive. The magnetic transducer 120 includes an underlayer 122 on which the nonmagnetic material(s) (not shown) are formed. Also shown are separation layer(s) 124, main pole 126, gap 128, side shields 130, and trailing shield 132. In the embodiment shown, the separation layer 124 and main pole 126 would reside in the trench (not shown) in the nonmagnetic layer(s) formed in step 102. The separation layer(s) 124 and main pole 126 are formed in step 104 and 106, respectively. The separation layer(s) 124 may be used to ensure that the main pole 126 is magnetically separated from the side shields 130, to adjust the track width of the main pole 126, and/or to protect the main pole 126 from damage during removal of the nonmagnetic layer(s) (not shown). The top portion of the gap 128 is a write gap. The gap 128 may be formed after removal of the nonmagnetic layer in step 108 and before the trailing shield in step 110. However, in another embodiment, the gap 128 may be formed at another time. In such an embodiment, the gap 128 might reside above the main pole 126, but not at the sides of the main pole 126 and separation layer(s) 124 and not below the side shields 130. As can be seen in FIG. 4, the side shields 130 and trailing shield 132 may meet, forming a wraparound shield for the magnetic transducer 120. However, in another embodiment, the gap 128 might be extended so that the trailing shield 132 is separated from the side shields 130. The trailing shield 132 might also be omitted. In another embodiment, a leading shield (not shown) may be provided below the underlayer. In the embodiment shown, the bottom of the main pole 126 is not closer to the underlayer than the side shields 130. Thus, the bottom of the main pole 126 is at the same height or higher than the bottom of the side shields 130.

Using the method 100, the transducer 120 may be formed. As a result, side shields 130 may be formed. The depth of the trench (not shown) and, therefore, the height of the main pole 126 may be controlled by the deposition process used to provide the nonmagnetic layer(s). As a result, better control over the height of the main pole 126 may be achieved. In addition, because of the presence of the side shields and the extension of the side shields 130 below the bottom of the main pole 126, the ability of the side shields 130 to reduce adjacent track writing by the main pole 126, particularly at a skew angle, may be improved. Further, because the main pole 126 is formed in a trench in the nonmagnetic materials (not shown), fabrication of the transducer 100 is more robust. In one embodiment, the side shields 130, as well as the trailing shield 132, may extend from the ABS to not past the coil front location. Coils (not shown) used to drive the main pole 126 may be decoupled from the side shields 130. Consequently, performance of the transducer 120 may be improved.

Figure 5:
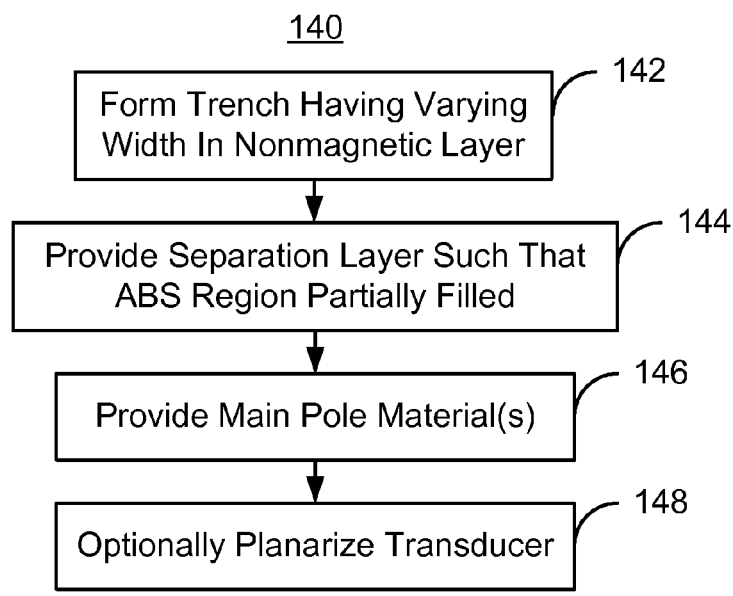
FIG. 5 depicts an exemplary embodiment of a method for providing a leading edge bevel.

As discussed above, the formation of the mail pole in step 106 may include formation of leading or trailing edge bevels. FIG. 5 depicts an exemplary embodiment of a method 140 for providing a leading edge bevel. The method 140 may be performed as part of the method 100. For simplicity, some steps may be omitted. The method 140 is also described in the context of providing a bevel for a single main pole. However, the method 140 may be used to fabricate multiple bevels at substantially the same time. The method 140 is also described in the context of particular layers. A particular layer may include multiple materials and/or multiple sublayers.

A trench having a varying width is provided in the non-magnetic layer, via step 142. Step 142 corresponds to step 102 of the method 100. For example, in the nose region of the pole, in proximity to where the ABS is to be formed, the trench may be thinner than in a yoke region. The technique used in step 142 may be analogous to that used in step 102. For example a RIE may be used.

The separation layer is provided, via step 144. Step 144 corresponds to step 104 of the method 100. The separation partially fills the trench in the ABS region. The trench formed in step 142 is sufficiently thin and the separation layer sufficiently thick that deposition of the separation layer in step 144 completely fills the bottom of the trench in the thin region. Thus, the trench is filled in the nose region proximate to the ABS, but not in a region distal from the ABS. The high moment, main pole material(s) are provided, via step 146. In one embodiment, step 146 includes plating the high moment material(s). In one such embodiment, step 146 may include depositing a seed layer. Further, the magnetic transducer may optionally be planarized, via step 148. Steps 146 and 148 may thus correspond to at least a portion of the step 106 of the method 100. Fabrication of the transducer may then be completed.

Figure 6:
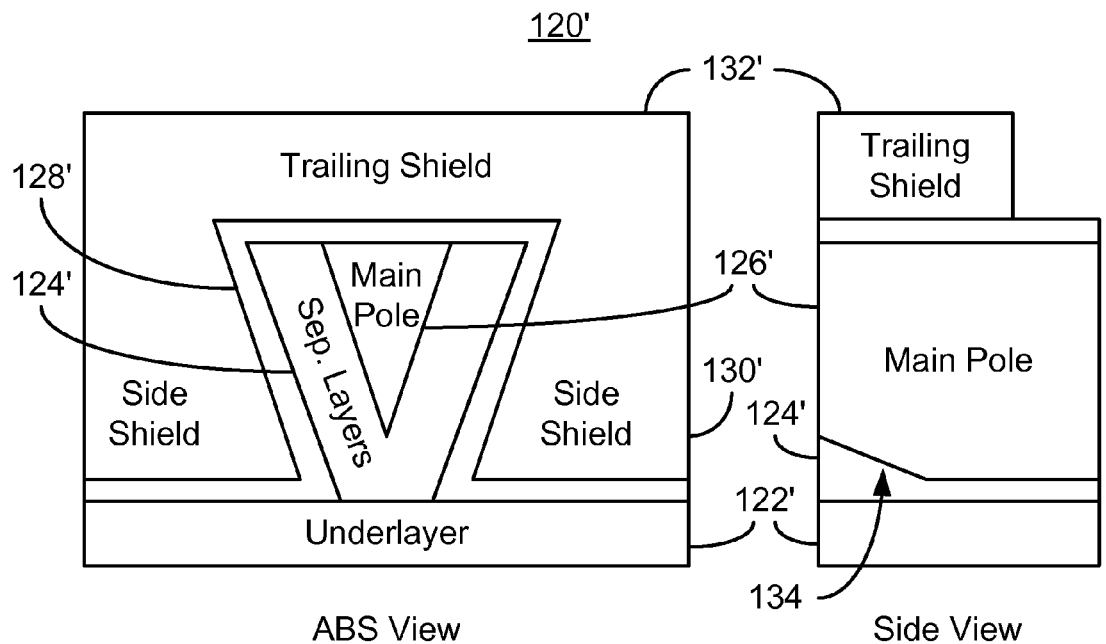
FIG. 6 depicts an ABS view of another exemplary embodiment of a magnetic recording transducer having side shields.

FIG. 6 depicts ABS and side views of an exemplary embodiment of a magnetic recording transducer 120' having side shields and formed using the method 140. For clarity, FIG. 6 is not to scale. The transducer 120' is analogous to the transducer 120 depicted in FIG. 4. Consequently, the transducer 120' has portions that are labeled similarly to the transducer 120. The magnetic transducer 120' thus includes an underlayer 122', separation layer(s) 124', main pole 126', gap 128', side shields 130', and trailing shield 132' that are analogous to underlayer 122, separation layer(s) 124, main pole 126, gap 128, side shields 130, and trailing shield 132, respectively. The underlayer 122', separation layer(s) 124', main pole 126', gap 128', side shields 130', and trailing shield 132' have analogous structure and function to underlayer 122, separation layer(s) 124, main pole 126, gap 128, side shields 130, and trailing shield 132, respectively. For clarity, only a portion of the transducer 120' is shown in the side view. For example, the side shields 130' are omitted. The transducer 120' may be part of a head including a slider and which is part of a disk drive.

In addition to the underlayer 122', separation layer(s) 124', main pole 126', gap 128', side shields 130', and trailing shield 132', a leading edge bevel 134 is shown. The combination of the thickness of the separation layer(s) 124' and the width of the trench in the ABS region ensures that the bottom of the trench is filled in the ABS region. However, as the trench widens, the separation layer(s) 124' no longer fill the bottom of the trench. Consequently, leading edge bevel 134 is formed. Although the leading edge bevel 134 is shown with a linear profile, in another embodiment, the leading edge bevel 134 might have another shape. Further, in the embodiment shown, the leading edge of the main pole 126' may terminate in a point at the ABS. Thus, the main pole 126' is substantially triangular at the ABS. However, in another embodiment, the main pole 126' may have another shape.

Using the method 140, the transducer 120' may be formed. As a result, the benefits of the transducer 120 and the method 100 may be achieved. Furthermore, a leading edge bevel 134 may also be provided. The leading edge bevel 134 may improve concentration of the magnetic flux at the ABS, improving the writeability of the transducer 120'. Further, as can be seen in FIG. 6, the leading edge of the main pole 126' may be very thin at the ABS. Such a profile would not be possible in a conventional dry etch process because such a conventional main pole would be mechanically unstable. Consequently, a lower track width may also be achieved. Further, note that in the method 140, the leading edge bevel 134 is automatically formed within the trench through deposition of the separation layer in step 144. Consequently, the leading edge bevel 134 is self-aligned. The leading edge bevel 134 thus does not require the use of additional masks, which could otherwise introduce an additional overlay sigma and adversely affect positioning of the leading edge bevel 134.

Figure 7:
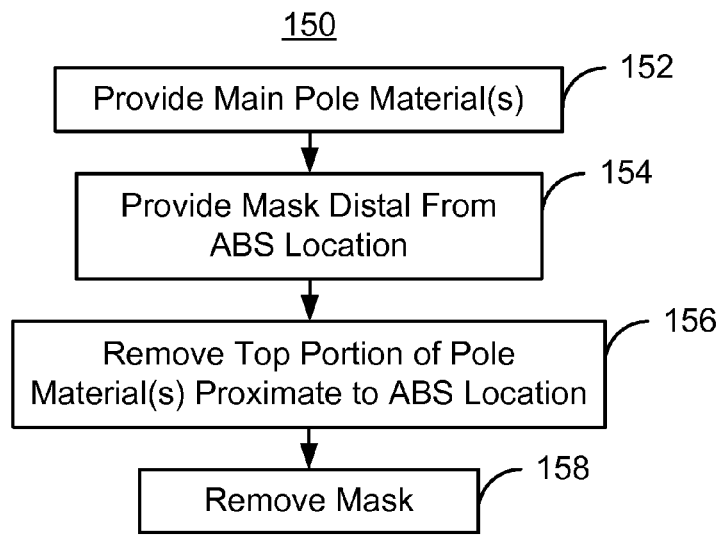
FIG. 7 depicts an exemplary embodiment of a method for providing a trailing edge bevel.

FIG. 7 depicts an exemplary embodiment of a method 150 for providing a trailing edge bevel. The method 150 may be performed as part of the method 100 depicted in FIG. 3. More specifically, the method 150 may be used as at least part of step 106 (providing the main pole) of the method 100. For simplicity, some steps may be omitted. The method 150 is also described in the context of providing a bevel for a single main pole. However, the method 150 may be used to fabricate multiple bevels at substantially the same time. The method 150 is also described in the context of particular layers. A particular layer may include multiple materials and/or multiple sublayers.

The high moment material(s) for the main pole are provided on the separation layer, via step 152. For example, the materials may be plated or deposited using another technique. In addition, a seed layer may be deposited on the separation layer prior to the main pole material(s) being provided. Also in step 152, the main pole material(s) may be planarized.

A mask is provided distal from the location at which the ABS will be formed, via step 154. For example, Step 154 may include providing a photoresist mask on the main pole material(s). In another embodiment step 154 may include providing a hard mask in addition to the photoresist mask. The mask has an aperture over the ABS region, where the bevel is to be formed. A top portion of the pole material(s) proximate to the ABS location is removed, via step 156. In one embodiment, step 156 includes performing an ion mill and/or an RIE. The mask fabricated in step 154 is then removed, via step 158.

Figure 8:
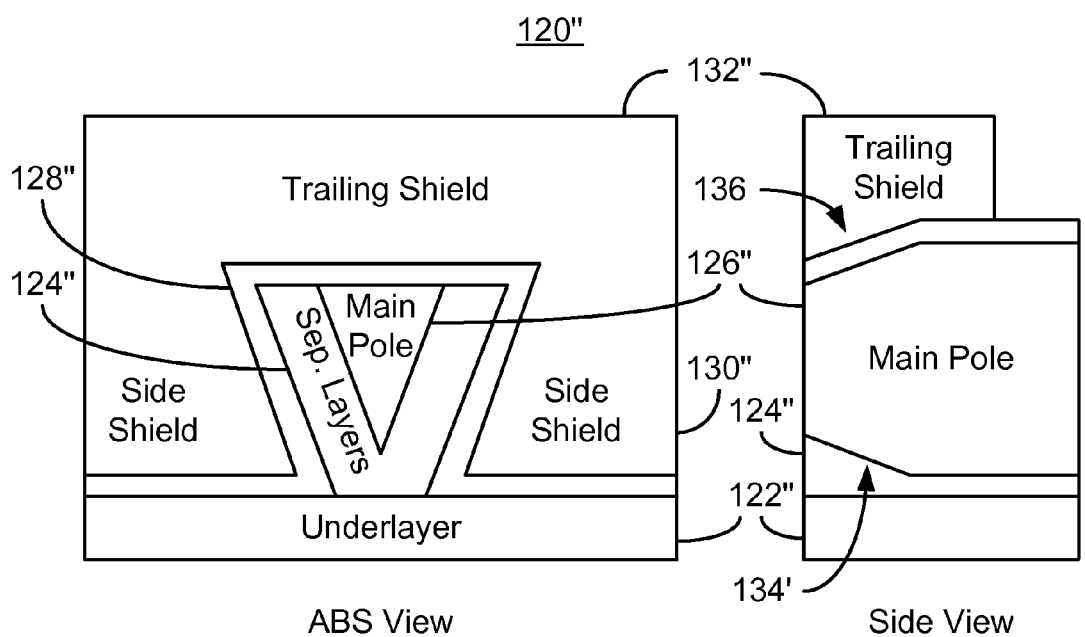
FIG. 8 depicts an ABS view of another exemplary embodiment of a magnetic recording transducer having side shields.

FIG. 8 depicts ABS and side views of an exemplary embodiment of a magnetic recording transducer 120" having side shields and formed using the method 150. For clarity, FIG. 8 is not to scale. The transducer 120" is analogous to the transducer 120 depicted in FIG. 4. In addition, the transducer 120" is analogous to the transducer 120' depicted in FIG. 6. Consequently, the transducer 120" has portions that are labeled similarly to the transducers 120 and 120'. The magnetic transducer 120" thus includes an underlayer 122", separation layer(s) 124", main pole 126", gap 128", side shields 130", trailing shield 132" and leading edge bevel 134' that are analogous to underlayer 122/122', separation layer(s) 124/124', main pole 126'/126', gap 128/128', side shields 130/130', trailing shield 132/132', and leading edge bevel 134, respectively. The underlayer 122", separation layer(s) 124", main pole 126", gap 128", side shields 130", trailing shield 132" and leading edge bevel 134' have analogous structure and function to underlayer 122/122', separation layer(s) 124/124', main pole 126'/126', gap 128/128', side shields 130/130', trailing shield 132/132', and leading edge bevel 134, respectively. However, in another embodiment, the leading edge bevel 134' may be omitted. For clarity, only a portion of the transducer 120" is shown in the side view. For example, the side shields 130" are omitted. The transducer 120" may be part of a head including a slider and which is part of a disk drive.

In addition to the underlayer 122", separation layer(s) 124", main pole 126", gap 128", side shields 130", trailing shield 132", and leading edge bevel 134', a trailing edge bevel 136 is shown. Although the trailing edge bevel 136 is shown with a linear profile, in another embodiment, the trailing edge bevel 136 might have another shape. The shape of the trailing shield 132" conforms to the trailing bevel 136.

Using the method 150, the transducer 120" may be formed. As a result, the benefits of the transducers 120 and 120", as well as the methods 100 and 140 may be achieved. Furthermore, a trailing edge bevel 136 may also be provided. The trailing edge bevel 136 may further improve concentration of the magnetic flux at the ABS. In addition, the field gradient may be improved by the trailing edge bevel 136, thereby improving the sharpness of the transition edge. Improvements in the sharpness of the transition edge may reduce jitter noise and transition noise. The writeability of and quality of transitions written by the transducer 120" may thereby be improved.

Figure 9:
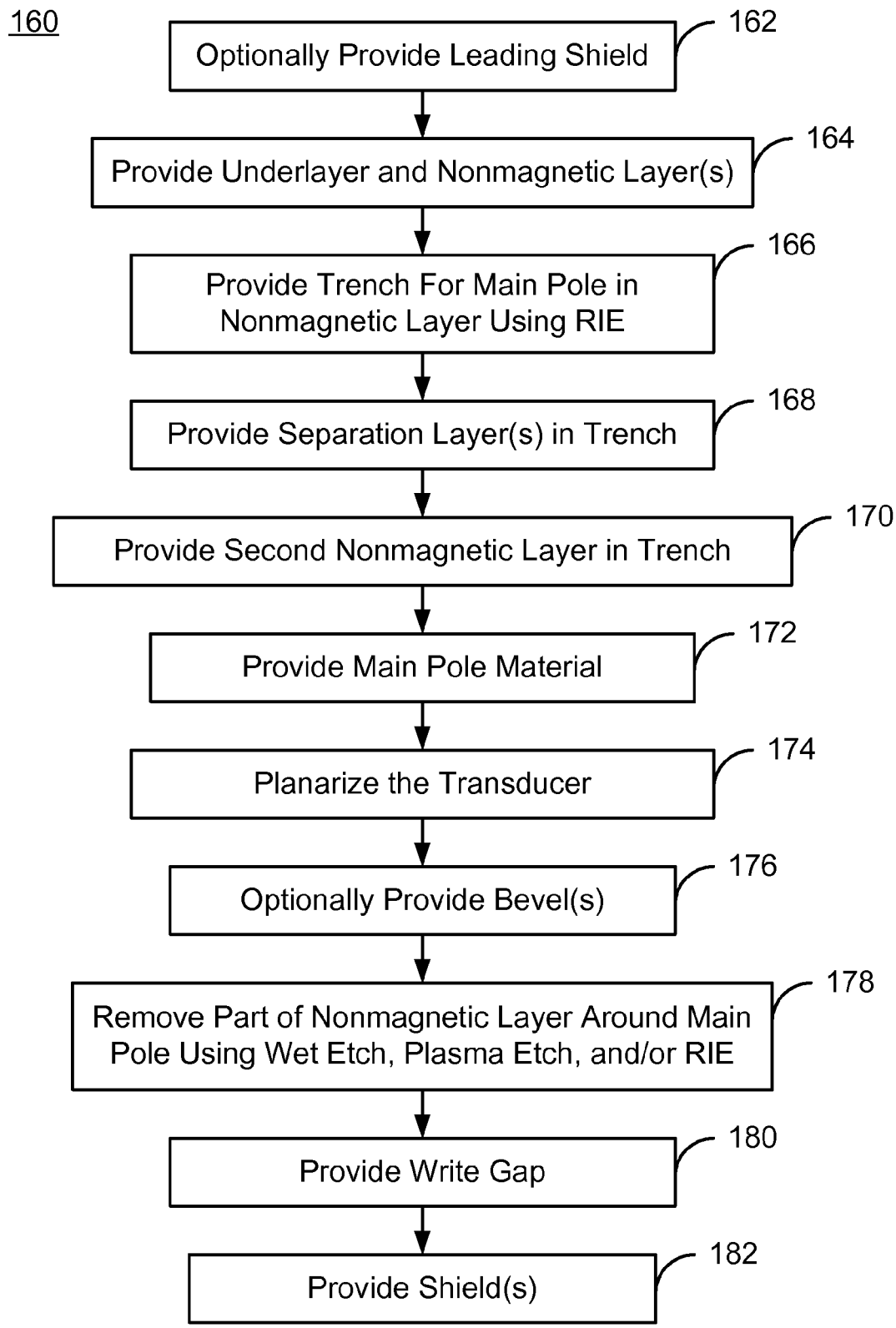
FIG. 9 is a flow chart depicting another exemplary embodiment of a method for fabricating a magnetic recording transducer having side shields.
Figure 10:
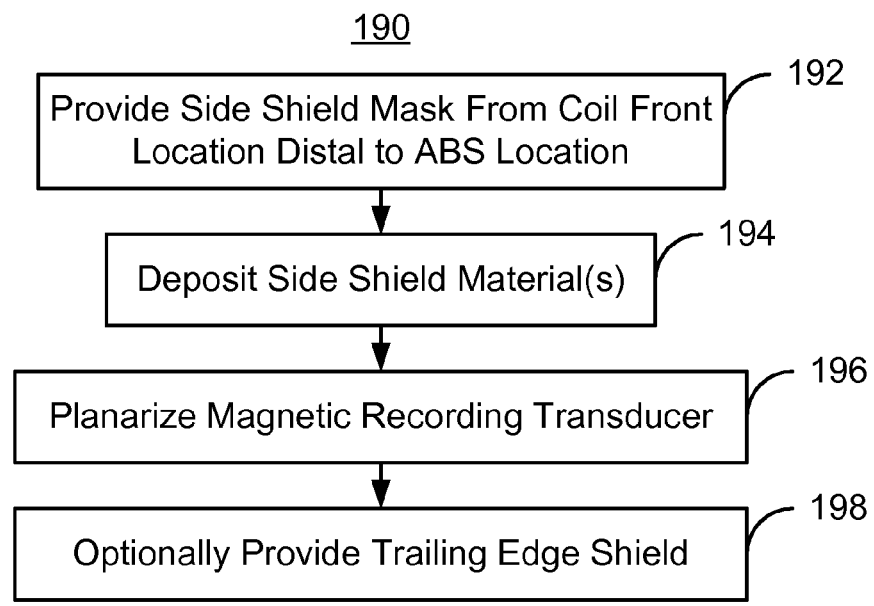
FIG. 10 is a flow chart depicting an exemplary embodiment of a method for providing a trailing shield.

FIG. 9 is a flow chart depicting another exemplary embodiment of a method 160 for fabricating a magnetic recording transducer having side shields. For simplicity, some steps may be omitted. FIG. 10 is a flow chart depicting an exemplary embodiment of a method 190 for providing a trailing shield. The method 190 may be part of the method 100 or 160. Consequently, the method 190 is described in the context of the method 160. FIGS. 11-23 depict exemplary embodiments of a magnetic recording transducer 200 during fabrication. Referring to FIGS. 9-23, the method 160 is described in the context of the transducers 200. The magnetic transducer 200 is not drawn to scale. Further, only certain components are shown. The method 160 is also described in the context of providing a single recording transducer. However, the method 160 may be used to fabricate multiple transducers and/or multiple poles at substantially the same time. The method 160 is also described in the context of particular layers. A particular layer may include multiple materials and/or multiple sublayers. The method 160 also may start after formation of other portions of the magnetic recording transducer.

A leading shield is optionally provided, via step 162. Step 162 may include providing a mask distal from the ABS. In particular, the mask may cover the portion of the transducer from the front of the coil(s) distal from the ABS. Thus, the mask may have an aperture that is at least from the ABS to some position no further from the AB than the front of coil(s). High moment material may then be deposited for the shield. An underlayer and nonmagnetic layer(s) may then be deposited, via step 164. In one embodiment, the underlayer deposited in step 164 is a RIE stop layer. The nonmagnetic layer(s) provided may include aluminum oxide, silicon oxide, silicon nitride, and/or cured photoresist.

A trench is provided in the nonmagnetic layer(s), via step 166. The sidewalls of the trench may correspond to the inner edges of side shield(s) being provided. The profile of the trench also may correspond to the main pole to be formed. The trench formed also may have a reverse angle, with the top of the trench being wider than its bottom. In one embodiment, step 166 includes providing a mask having an aperture corresponding to the location of the trench. Portions of the nonmagnetic layer(s) exposed by the aperture may then be removed. The removal may use a RIE appropriate to the nonmagnetic material in which the trench is being formed and employ an RIE hard mask.

Figure 11:
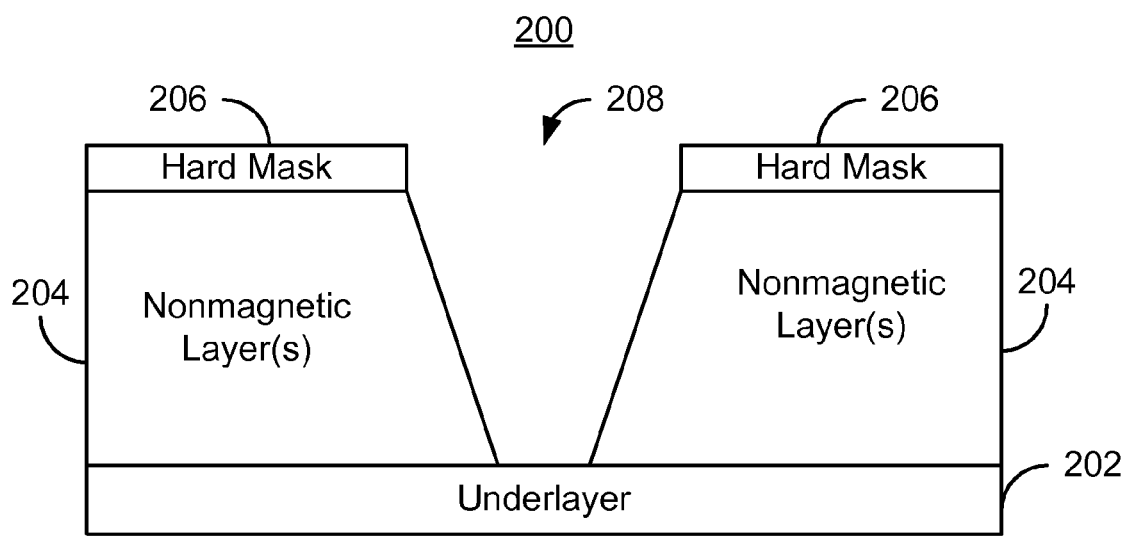
FIGS. 11-23 depict exemplary embodiments of magnetic recording transducers during fabrication.

FIG. 11 depicts the magnetic transducer 200 after step 166 is performed. The transducer 200 shown includes an underlayer 202 and nonmagnetic layer(s) 204. Also shown is the hard mask 206 used to form the trench 208. The base of the trench 208 is the underlayer 202.

Separation layer(s) are provided in the trench on the nonmagnetic layer, via step 168. In one embodiment, step 168 may include using atomic layer deposition (ALD) to provide the separation layer. However, in other embodiments, other techniques might be used. Thus, a portion of the separation layer(s) resides on the sides of the trench. In one embodiment, the separation layer(s) include one or more layers of aluminum oxide and/or Ru. For example, if the nonmagnetic layer includes aluminum oxide, then Ru may be provided for the separation layer(s) in step 168. If the nonmagnetic layer includes silicon oxide, silicon nitride, or cured photoresist, then aluminum oxide may be provided for the separation layer(s) in step 168. However, another nonmagnetic material that is resistant to the process used in step 178, described below, may be used. Additional nonmagnetic layer(s), such as seed layers, may be provided in step 170.

Figure 12:
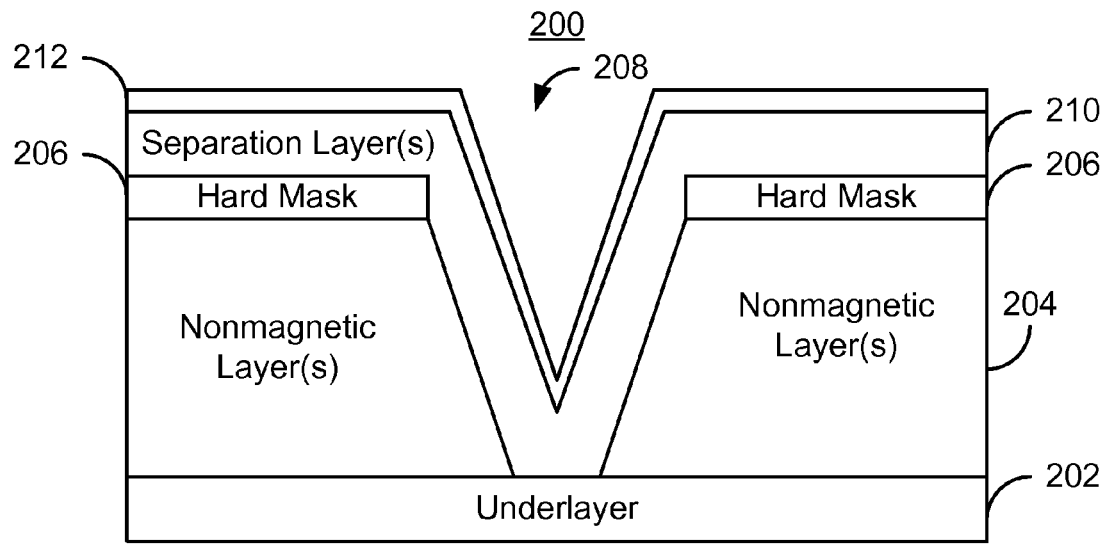

FIG. 12 depicts the transducer 200 after step 170 is performed. Consequently, separation layer(s) 210 and nonmagnetic layer(s) 212 are shown. A portion of the separation layer(s) 210 reside on the sides of the trench 208. Another portion of the separation layer(s) 210 are on the hard mask 206. In the embodiment shown, the separation layer(s) 210 fill the bottom of the trench 208.

Figure 13:
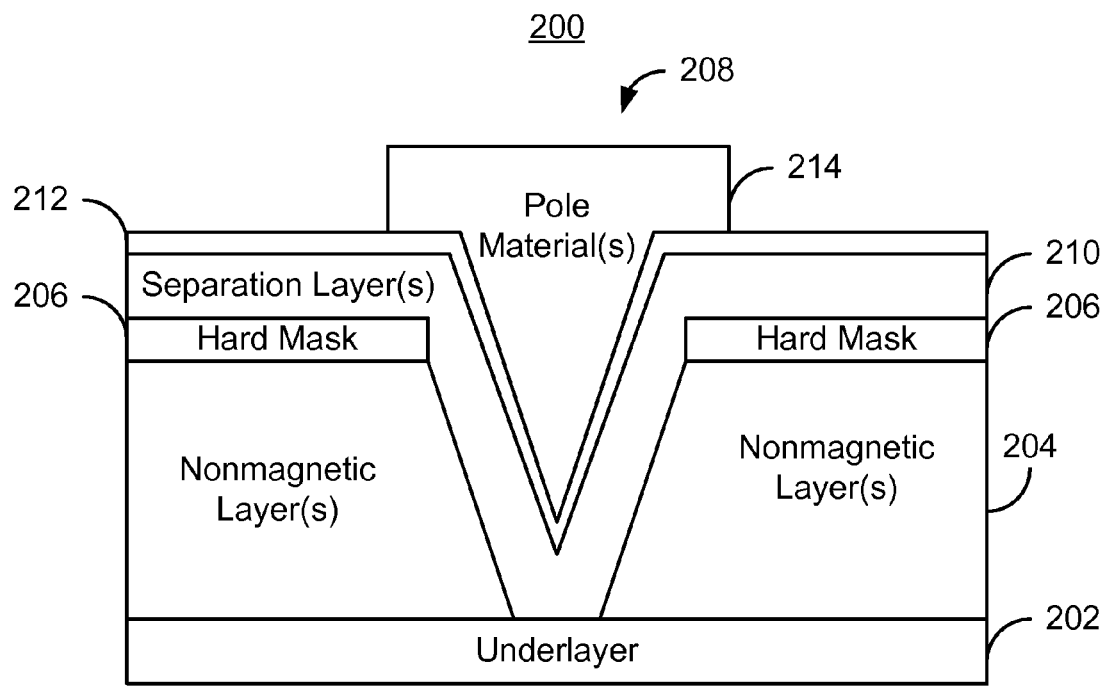

The high magnetic moment material(s) for the main pole are deposited, via step 172. FIG. 13 depicts the transducer 200 after step 172 is performed. Consequently, pole material(s) 214 are shown. A portion of the main pole material 214 resides in the trench 208 and thus on the separation layer(s) 210. In addition, another portion of the main pole material(s) 214 lies on the portion of the separation layer(s) 210 outside of the trench 208. Further, because the separation layer(s) 210 fill the bottom of the trench 108, a leading edge bevel may be automatically formed at the bottom of the pole material(s) 214.

Figure 14:
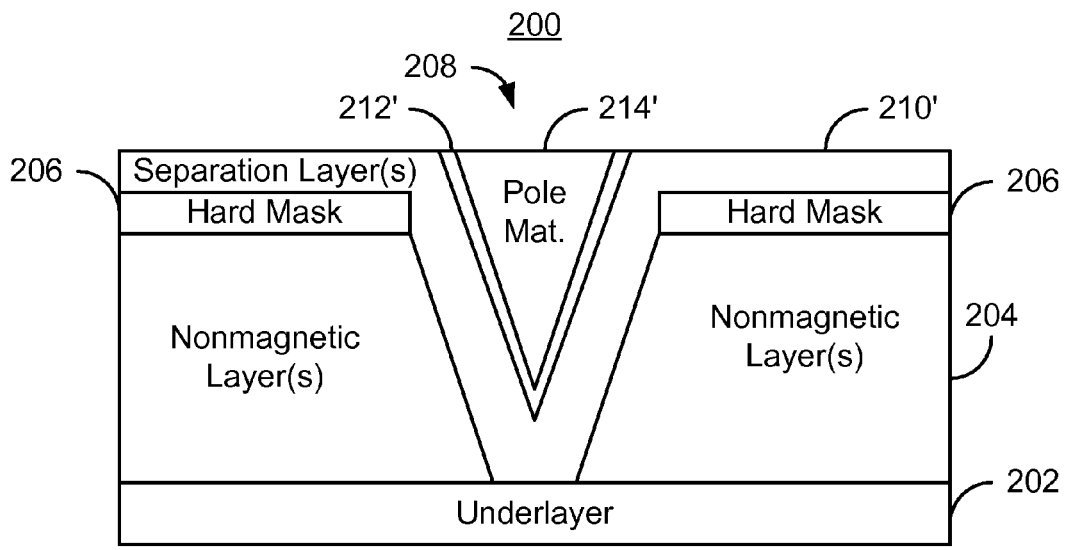

The transducer 200 may then be planarized, via step 174. In one embodiment, a chemical mechanical planarization (CMP) may be performed. FIG. 14 depicts the magnetic transducer after step 174 is performed. Consequently, the top surface of the transducer 200 is substantially flat. The pole material(s) 214' and remaining portions of the separation layer(s) 210' and additional nonmagnetic layer(s) 212' form a substantially flat surface.

Figure 15:
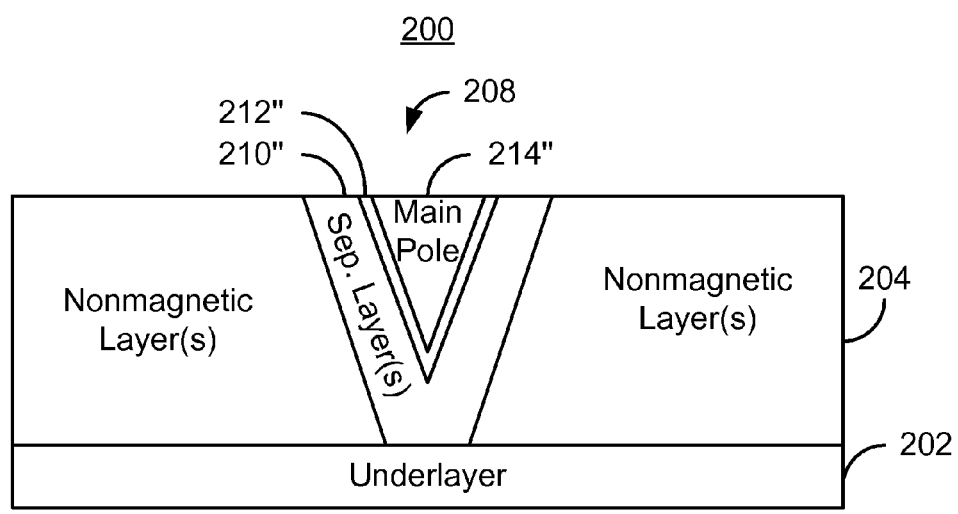

Bevel(s) may be optionally provided, via step 176. Step 176 may be performed using the method 140 and/or 150. Thus, a leading edge bevel may be formed in steps 166, 170, and 172. A trailing edge bevel may also be formed in step 176, for example using the method 150. FIG. 15 depicts the transducer 200 after step 176 is performed. In the embodiment shown, both leading and trailing edge bevels have been formed. In particular, a top portion of the main pole material(s) 214' has been removed, leaving main pole 214" and remaining portions of the separation layer(s) 210" and additional nonmagnetic layer(s) 212". Thus, although not labeled, the leading edge bevel is formed in steps 166, 170, and 172. Similarly, although not labeled, the trailing edge bevel is indicated by the reduced height of the main pole 214" in FIGS. 15-23.

Figure 16:
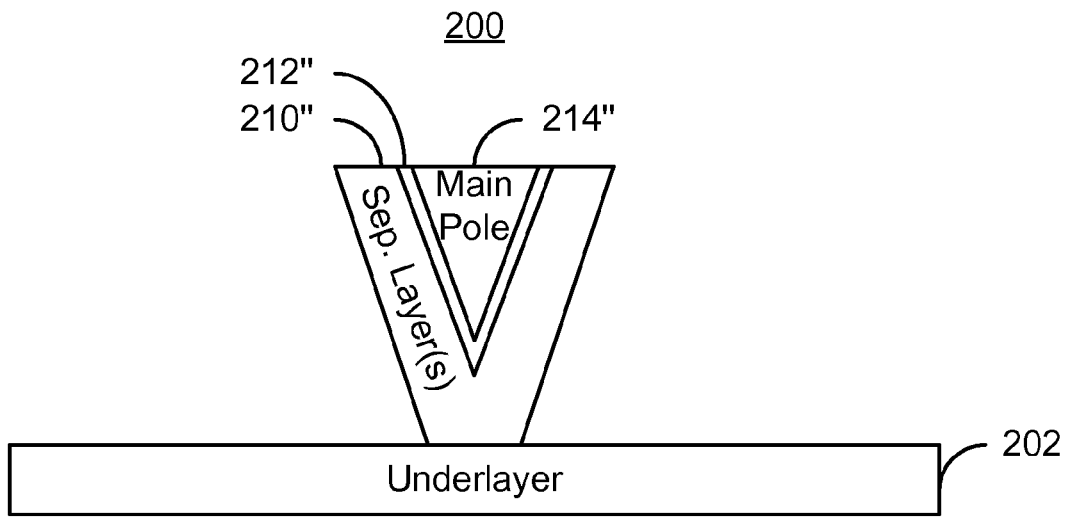

A remaining portion of the nonmagnetic layer 204 is removed, via step 178. The technique(s) used to remove the nonmagnetic layer(s) may vary and may depend upon the nonmagnetic layer 204 used. Step 178 may thus include using one or more of a wet etch, an RIE, and a plasma etch. For example, if the nonmagnetic layer(s) 204 include aluminum oxide, a wet etch and/or a plasma etch or RIE with a chlorine chemistry may be used. If the nonmagnetic layer(s) 204 include silicon oxide or silicon nitride, then an RIE or plasma etch having a fluorine chemistry may be used. If the nonmagnetic layer(s) 204 include cured photoresist, then a plasma etch and/or RIE with an oxygen chemistry might be used. Alternatively, a combination of techniques, for example a combination of a wet etch and an RIE and/or plasma etch might be used in step 178. FIG. 16 depicts the transducer 200 after step 178 has been performed. Thus, the nonmagnetic layer(s) 204 have been removed. The sides of the separation layer(s) 210" are thus exposed. In addition, although the main pole 214" is substantially triangular in shape, the separation layer(s) 210" have a wider bottom and provide sufficient mechanical stability to prevent the main pole 214" from detaching from the transducer 200.

Figure 17:
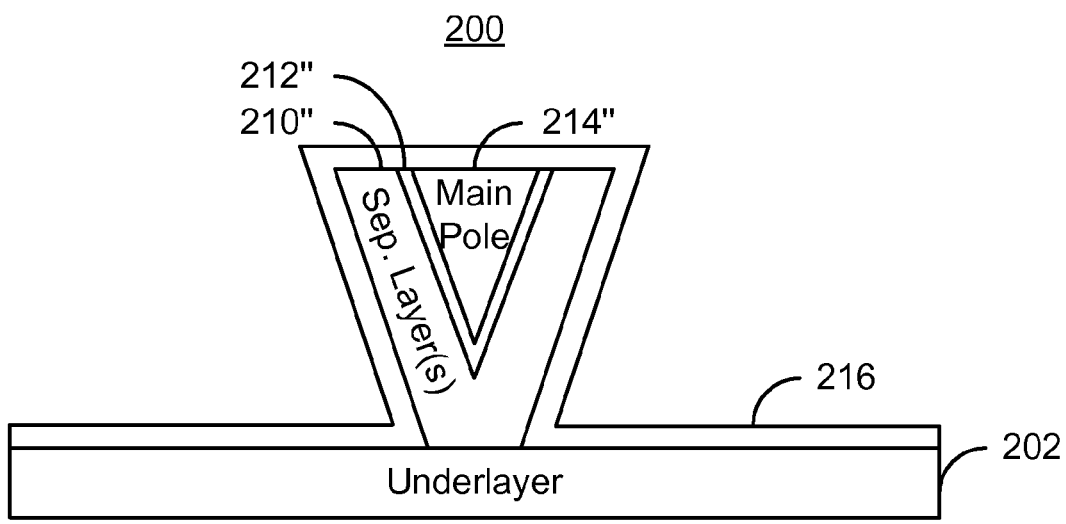

A write gap is provided, via step 180. Thus, a nonmagnetic material, such as Ru, is deposited in step 180. In one embodiment, the write gap is blanket deposited. In another embodiment, the write gap may be formed only on the main pole 214". FIG. 17 depicts the transducer 200 after step 180 is performed. Consequently, write gap 216 is shown. Note that although termed a write gap, in the embodiment shown, the write gap 216 covers not only the top of the main pole 214", but also the sides of the separation layer 210" and exposed surface of the underlayer 202. Thus, the write gap 216 may also provide a portion of the side gap between the main pole 214" and side shields (not shown).

Figure 18:
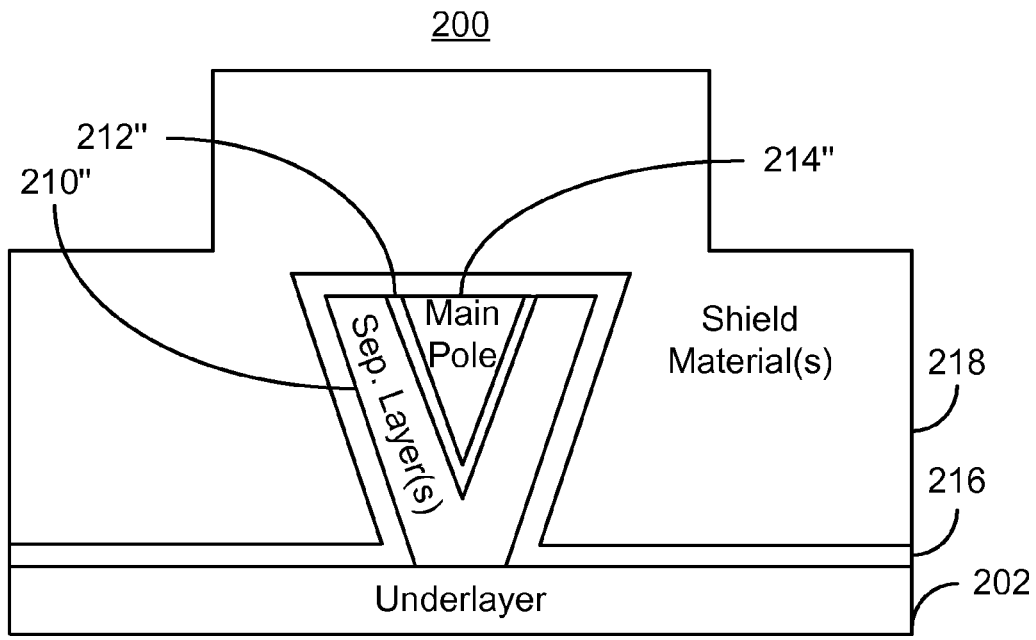
Figure 19:
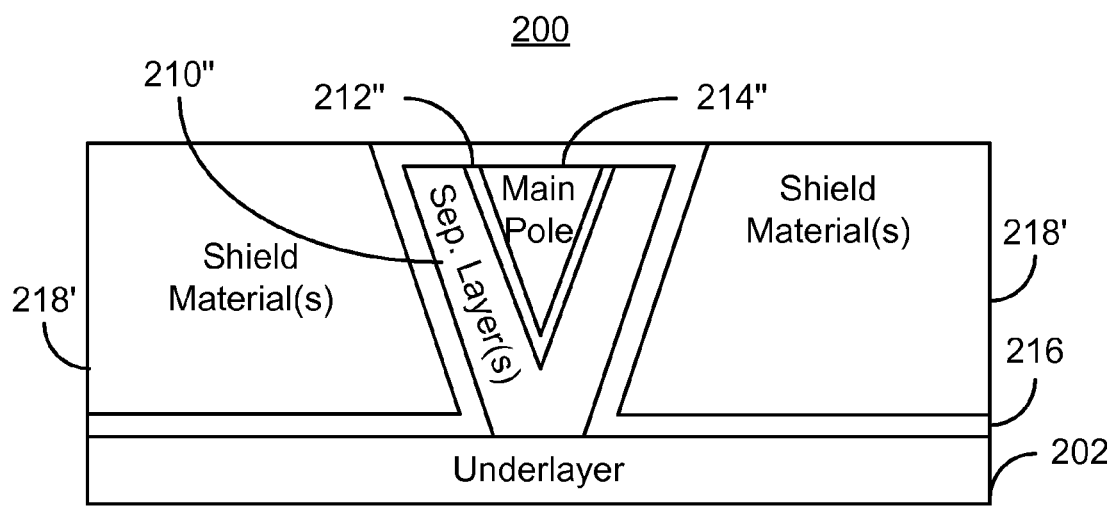

Shield(s) may be provided, via step 182. In one embodiment, step 182 includes providing side shields only. However, in another embodiment, step 182 includes providing side and trailing shields. In addition, the side and trailing shields may not extend further from the ABS than the front of the coils (not shown) used to drive the main pole 214". FIG. 10 depicts one embodiment of a method 190 that may be used to provide the shields in step 182. A side shield mask from not further than the coil front location and extending distal from the ABS is provided, via step 192. The mask thus exposes a region of the transducer that is at least from the ABS to not further than the coil front location. The side shield material(s) are deposited, via step 194. In one embodiment, step 194 includes depositing any seed layers. In addition, a magnetically soft, high moment material may be provided. FIG. 18 depicts the transducer 200 after step 194, or part of step 182, is performed. Thus, the shield material(s) 218 are shown. Further, in FIG. 18, the trailing and side shields may be considered to be formed together. However, the side shields and trailing shields may be desired to be separately formed. Thus, the transducer 200 may optionally be planarized, via step 196. In one embodiment, step 196 may include using a CMP. FIG. 19 depicts the transducer after step 196, or part of step 182, is performed. Thus, the side shield materials 218' are shown. In addition, the write gap 216 might be exposed. However, in another embodiment, no portion of the write gap 100 is exposed. The trailing shield may be provided, via step 198, if the trailing and side shields are not formed together. Thus, step 182 may be completed if a wraparound shield is to be fabricated.

Figure 20:
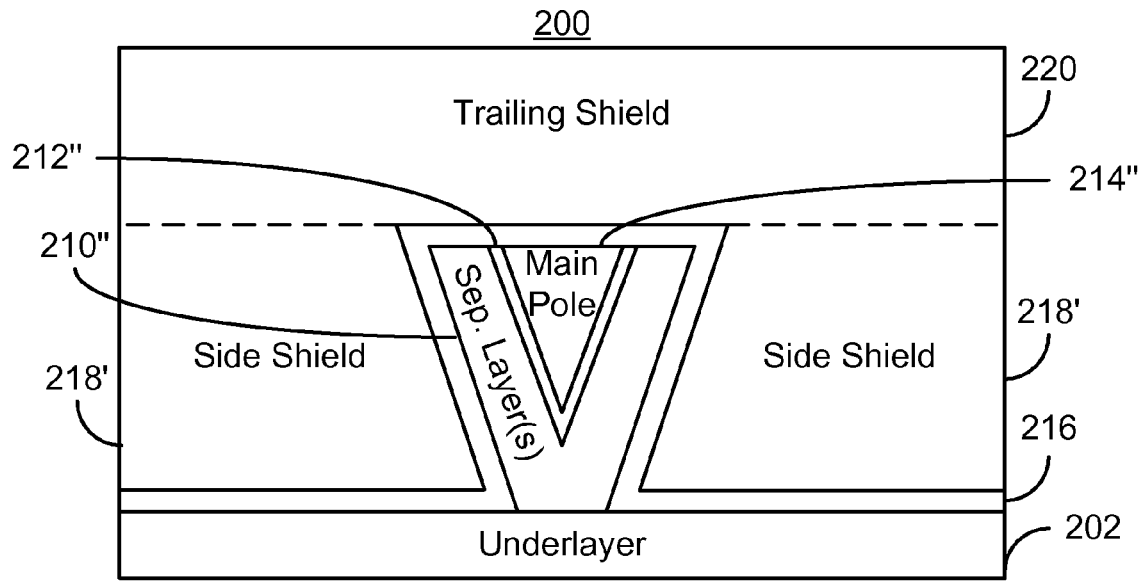
Figure 21:
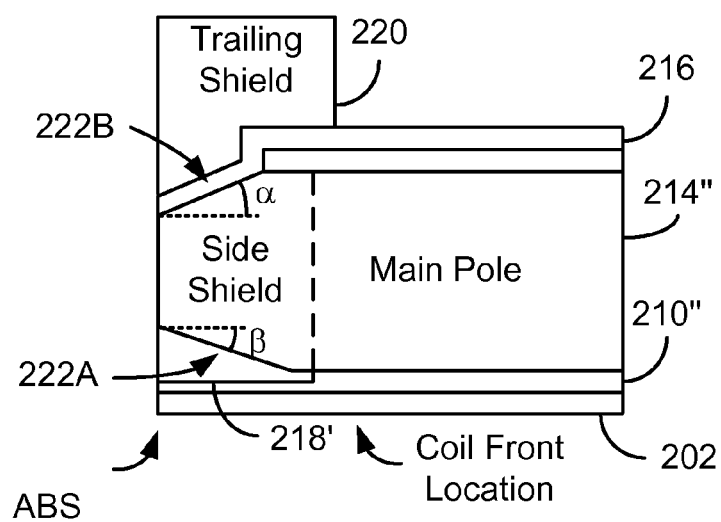

FIGS. 20-21 depict ABS and side views of the transducer 200 after step 182, as well as the method 190, have been completed. Thus, side shields 218' and trailing shield 220 are shown. In addition, the bevels 222A and 222B are shown. Although shown as having different angles, α and β, in other embodiments these angles may be the same. Similarly, although the leading edge bevel 222A is shown as extending further from the ABS than the trailing edge bevel 222B, this is not required. Because of the presence of the separation layer(s) 210", the side shield(s) 218' are magnetically separated from the sides of the main pole 214". Further, the side shields 218' and trailing shield 220 do not extend further from the ABS than the coil front location. However, in another embodiment, the side shields 218' and/or the trailing shield 220 may extend further than the coil front location. Further, the trailing shield 220 and side shields 218' are shown as separately formed. However, in another embodiment, the trailing shield 220 and side shields 218' may be formed together and thus may extend the same distance from the ABS.

Figure 22:
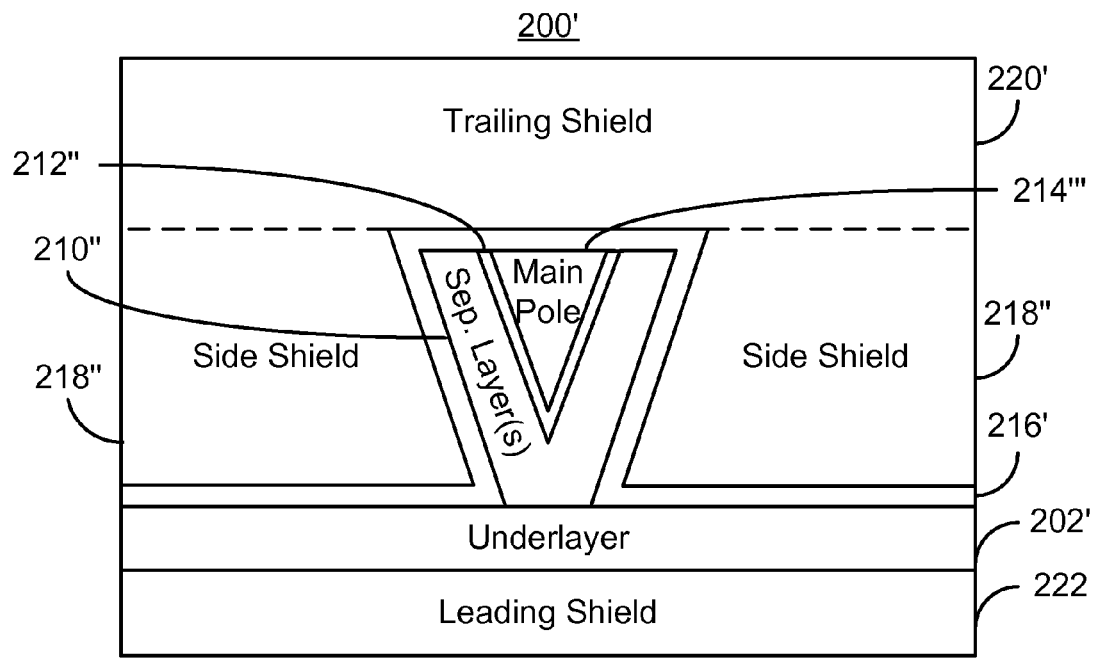
Figure 23:
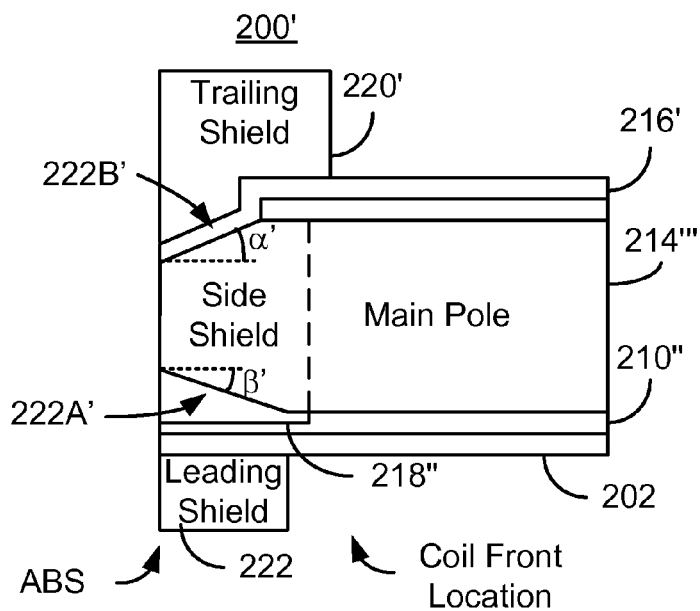

FIGS. 22-23 depict ABS and side views of the transducer 200' after step 182, as well as the method 190, have been completed. The transducer 200' is analogous to the transducer 200. Consequently, similar components have similar labels. The transducer 200' thus includes underlayer 202', separation layers 210''', nonmagnetic layer(s) 212''', main pole 214''', write gap 216', side shields 218'', trailing shield 220' and bevels 222A' and 222B' that correspond to underlayer 202, separation layers 210", nonmagnetic layer(s) 212", main pole 214", write gap 216, side shields 218', trailing shield 220' and bevels 222A and 222B. The underlayer 202', separation layers 210''', nonmagnetic layer(s) 212''', main pole 214''', write gap 216', side shields 218'', trailing shield 220' and bevels 222A' and 222B' have a similar structure and function to underlayer 202, separation layers 210", nonmagnetic layer(s) 212", main pole 214", write gap 216, side shields 218', trailing shield 220' and bevels 222A and 222B. In addition, the transducer 200' includes a leading shield 222. Like the side shields 218" and trailing shield 220', the leading shield 222 does not extend farther than the coil front location. However, in another embodiment, the side shields 218", trailing shield 220' and/or the leading shield 222' may extend further than the coil front location. Further, the trailing shield 220' and side shields 218" are shown as separately formed. However, in another embodiment, the trailing shield 220' and side shields 218" may be formed together and thus may extend the same distance from the ABS.

Thus, the method 160 and 190, the transducers 200/200' may be formed. As a result, side shields 218'/218" that extend from the ABS to not past the coil front location are provided. Further, because the main pole 214'/214" is formed in a trench in the nonmagnetic materials 204, fabrication of the transducers 200/200' is more robust. In addition, because the side shields 218'/218" may extend to or below the bottom of the main pole 214'/214", the ability of the side shields 218'/218" to reduce adjacent track writing may also be improved. Writeability of the transducers 200/200' may also be improved by the bevels 222A/222A' and 222B/222B'. Consequently, performance and fabrication of the transducer may be improved.

We claim:

1. A method for fabricating a magnetic transducer having an underlayer and using a nonmagnetic layer residing on the underlayer, the method comprising:

providing a trench in the nonmagnetic layer, the trench having a plurality of sides;

providing a separation layer on the nonmagnetic layer, a portion of the separation layer residing on the plurality of sides of the trench;

providing a main pole, at least a portion of the main pole residing in the trench on the portion of the separation layer and having a plurality of pole sides;

removing at least a portion of the nonmagnetic layer, thereby exposing the portion of the separation layer;

providing a side shield adjacent to the portion of the separation layer, the portion of the separation layer magnetically separating the plurality of pole sides from the side shield.

2. The method of claim 1 wherein the step of removing the at least the portion of the nonmagnetic layer further includes:
   wet etching the at least the portion of the nonmagnetic layer.

3. The method of claim 1 wherein the step of removing the at least the portion of the nonmagnetic layer includes:
   wet etching the at least the portion of the nonmagnetic layer.

4. The method of claim 1 wherein the nonmagnetic layer includes at least one of aluminum oxide, silicon nitride, silicon oxide, and cured photoresist.

5. The method of claim 1 wherein the underlayer is an etch stop layer and wherein the trench has a bottom, a portion of the etch stop layer forming the bottom of the trench.

6. The method of claim 1 wherein the step of providing the trench further includes:
   forming the trench in the nonmagnetic layer using a reactive ion etch.

7. The method of claim 1 wherein the step of providing the main pole further includes:
   providing at least a second nonmagnetic layer over the separation layer:
   providing at least one magnetic layer; and
   planarizing the at least one magnetic layer.

8. The method of claim 1 wherein the step of providing the side shield further includes:
   providing a side shield mask, the side shield mask extending from at least a coil front location distal from an air bearing surface (ABS) location; and
   depositing a side shield material.

9. The method of claim 1 further comprising:
   providing a trailing shield, at least a portion of the trailing shield residing on the main pole.

10. The method of claim 1 further comprising:
   providing a leading shield under the underlayer.

11. The method of claim 1 further comprising:
   providing a write gap, at least a portion of the write gap residing on the main pole.

12. The method of claim 1 wherein the separation layer includes at least one of Ru and aluminum oxide.

13. The method of claim 1 wherein the step of removing the at least the portion of the nonmagnetic layer further includes:
   at least one of plasma etching and reactive ion etching the at least the portion of the nonmagnetic layer in a plasma.

14. The method of claim 13 wherein the plasma includes at least one an oxygen plasma, a fluorine based chemistry, and a chlorine based chemistry.

15. The method of claim 1 wherein the step of providing the main pole further includes:
   forming at least one of a trailing edge bevel and a leading edge bevel.

16. The method of claim 15 wherein the step of forming at least one of a leading edge bevel and a trailing edge bevel further includes:
   providing a mask on the main pole distal from an air-bearing surface location; and
   removing a portion of the main pole proximate to the air-bearing surface location.

17. A method for fabricating a magnetic transducer having an underlayer and using a first nonmagnetic layer residing on the underlayer, the method comprising:
   providing a trench in the first nonmagnetic layer, the trench having a plurality of sides;
   providing a separation layer on the first nonmagnetic layer, a portion of the separation layer residing on the plurality of sides of the trench, the separation layer including at least one of Ru and aluminum oxide;
   depositing a second nonmagnetic layer on the separation layer;
   providing a magnetic material on the second nonmagnetic layer;
   planarizing the magnetic material, a remaining portion of the magnetic material having a plurality of pole sides;
   removing a remaining portion of the first nonmagnetic layer, exposing the portion of the separation layer;
   depositing a write gap, the write gap covering at least a remaining portion of the magnetic material;
   providing a wraparound shield, the portion of the separation layer magnetically separating the plurality of pole sides from the wraparound shield.

\* \* \* \* \*